United States Patent
Hou et al.

(10) Patent No.: US 10,442,624 B2
(45) Date of Patent: *Oct. 15, 2019

(54) REINFORCING LAYER FOR RUBBER PRODUCT

(71) Applicant: The Yokohama Rubber Co., LTD., Minato-ku, Tokyo (JP)

(72) Inventors: Gang Hou, Hiratsuka (JP); Ryotaro Suefuji, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/578,678

(22) PCT Filed: May 11, 2016

(86) PCT No.: PCT/JP2016/064052
§ 371 (c)(1),
(2) Date: Nov. 30, 2017

(87) PCT Pub. No.: WO2016/194570
PCT Pub. Date: Dec. 8, 2016

(65) Prior Publication Data
US 2018/0305129 A1    Oct. 25, 2018

(30) Foreign Application Priority Data

Jun. 3, 2015 (JP) ................................. 2015-112884

(51) Int. Cl.
*B65G 15/36* (2006.01)
*B65G 15/34* (2006.01)

(52) U.S. Cl.
CPC ............. *B65G 15/36* (2013.01); *B65G 15/34* (2013.01); *B65G 2812/02207* (2013.01)

(58) Field of Classification Search
CPC ... B60C 9/0007; B60C 9/0042; D07B 1/0613; D07B 1/06; D07B 1/026; D07B 1/0633;
(Continued)

(56) References Cited

U.S. PATENT DOCUMENTS 3,090,189 A * 5/1963 Saint-Frison ......... B60C 9/0007
57/236
3,957,091 A * 5/1976 Buyssens .............. B29C 70/226
139/425 R
(Continued)

FOREIGN PATENT DOCUMENTS

JP    S52-008084    1/1977
JP    S62-149937    7/1987
(Continued)

OTHER PUBLICATIONS

International Search Report for International Application No. PCT/JP2016/064052 dated Aug. 9, 2016, 4 pages, Japan.

*Primary Examiner* — Camie S Thompson
(74) *Attorney, Agent, or Firm* — Thorpe North & Western

(57) ABSTRACT

The present technology provides a reinforcing layer for a rubber product. A reinforcing layer embedded in a conveyor belt is composed of a plurality of steel cords embedded so as to extend in the belt longitudinal direction side by side in parallel. The outer diameter of the steel cords is not less than 0.35 mm and not greater than 6.0 mm, and the side-by-side pitch is greater than 0.35 mm and not greater than 7.0 mm.

2 Claims, 5 Drawing Sheets

(58) Field of Classification Search
CPC ....... D07B 1/068; Y10S 57/902; B65G 15/36; B65G 15/34; B65G 2812/02207; D01B 2101/20; B29B 15/08; B29C 70/226; B29C 70/16; B29D 2030/381; B29D 30/38; B29K 2305/00; B29L 2031/7092; B29L 2031/7094; D10B 2505/022; D10B 2505/00; D10B 2505/02; D03D 15/0088; D03D 15/02; D03D 1/00; D03D 1/0094; D03D 9/00; Y10T 442/124
USPC ............ 57/902; 152/451; 156/176; 198/847; 442/15
See application file for complete search history.

(56) References Cited

U.S. PATENT DOCUMENTS

| | | |
|---|---|---|
| 4,064,915 A | 12/1977 | Buyssens et al. |
| 4,168,340 A | 9/1979 | Buyssens et al. |
| 2015/0246775 A1 | 9/2015 | Suefuji |
| 2018/0148263 A1* | 5/2018 | Hou ........................ D07B 1/06 |

FOREIGN PATENT DOCUMENTS

| | | |
|---|---|---|
| JP | H04-209115 | 7/1992 |
| JP | H11-106016 | 4/1999 |
| JP | 2012-036539 | 2/2012 |
| TW | WO 2014/042097 | 3/2014 |

* cited by examiner

REINFORCING LAYER FOR RUBBER PRODUCT

TECHNICAL FIELD

The present technology relates to a reinforcing layer for a rubber product, and more particularly to a reinforcing layer for a rubber product capable of effectively reducing the energy required to manufacture and use a rubber product, without sacrificing the reinforcing function imparted by the reinforcing layer.

BACKGROUND ART

Reinforcing layers for reinforcing the rubber used to form rubber products are embedded in rubber products such as tires, conveyor belts, and rubber hoses. Steel cords constituted by steel wires intertwined together are used as reinforcing members which constitute reinforcing layers. The structures of steel cords vary, but there is a known strand structure which, for example, has a plurality of sheath strands intertwined around the outer circumferential surface of a core strand (specifically, see Japanese Unexamined Patent Application Publication No. 2012-036539A). To manufacture these rubber products, a reinforcing layer formed from a plurality of steel cords extending side by side in parallel is embedded in an unvulcanized rubber member to form a molded article. Thereafter, the molded article is heated at a predetermined temperature and pressurized at a predetermined pressure in a vulcanization process to vulcanize the unvulcanized rubber. Thus, a rubber product in which a reinforcing layer composed of steel cords is embedded is completed.

In recent years, there has been an increasing awareness of energy conservation, and the demand for energy conservation in rubber products has intensified as a result. For example, when a rubber product is reduced in weight, the energy required to transport and use the rubber product can be reduced. Alternatively, when a rubber product is reduced in thickness, this contributes to a reduction in weight and also enables a reduction in vulcanization time, which makes it possible to reduce the energy required for manufacture.

Therefore, reducing the weight and thickness of a reinforcing layer makes it possible to achieve energy conservation. However, when a reinforcing layer is simply reduced in weight and thickness, there is a problem in that the original reinforcing function of the reinforcing layer is diminished.

SUMMARY

The present technology provides a reinforcing layer for a rubber product capable of effectively reducing the energy required to manufacture and use a rubber product, without sacrificing the reinforcing function imparted by the reinforcing layer.

A reinforcing layer for a rubber product according to the present technology is a reinforcing layer for a rubber product formed from a plurality of steel cords extending side by side in parallel and embedded in a rubber used to form a rubber product, an outer diameter of the steel cords being not less than 0.35 mm and not greater than 6.0 mm, and a side-by-side pitch of the steel cords being greater than 0.35 mm and not greater than 7.0 mm.

With the reinforcing layer for a rubber product according to the present technology, it is possible to reduce the thickness and weight of the reinforcing layer by setting the diameter of the steel cords constituting the reinforcing layer to not less than 0.35 mm and not greater than 6.0 mm, which is a smaller diameter than that of conventional steel cords. As a result, it is possible to reduce the energy required to transport and operate a rubber product in which this reinforcing layer is embedded. In addition, a reduction in the thickness of the reinforcing layer also leads to a reduction in the vulcanization time of a rubber product in which the reinforcing layer is embedded. This makes it possible to also reduce the energy required to manufacture the rubber product. It is therefore possible to effectively reduce the energy required to manufacture and use a rubber product.

Reducing the diameter of steel cords while reducing the side-by-side pitch of the steel cords in comparison to that of conventional steel cords enhances the steel cord number density per unit reinforcing layer width. This makes it possible to ensure that there is no loss in the reinforcing function of the reinforcing layer.

DETAILED DESCRIPTION

Figure 1:
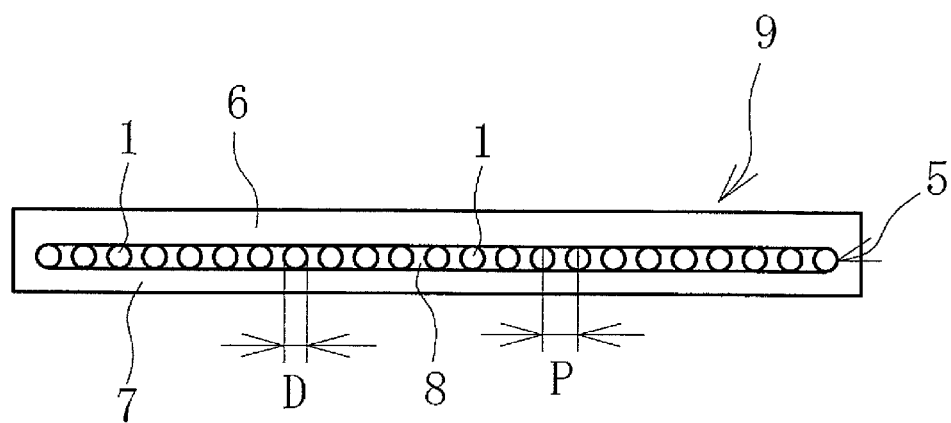
FIG. 1 is a horizontal cross-sectional view illustrating a conveyor belt in which the reinforcing layer of the present technology is embedded.

The reinforcing layer for a rubber product according to the present technology will be described hereinafter based on the embodiments illustrated in the drawings using a case in which the reinforcing layer is used in a conveyor belt as an example.

Figure 2:
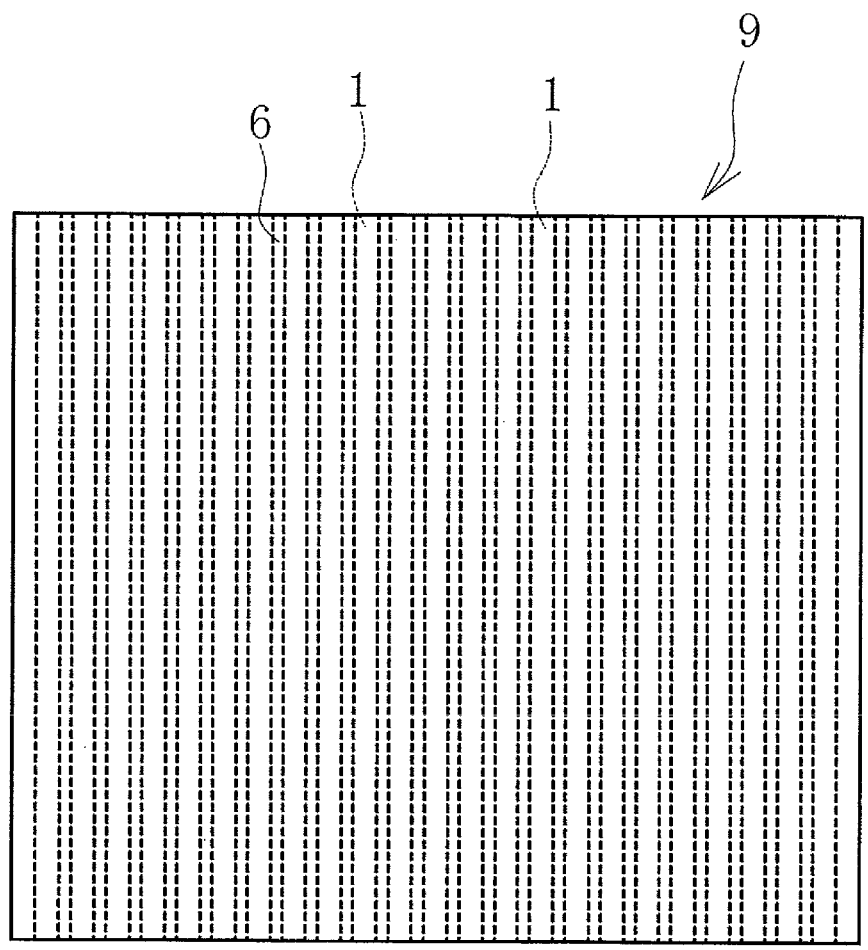
FIG. 2 is a plan view of the conveyor belt illustrated in FIG. 2.

A reinforcing layer 5 for a rubber product according to the present technology (called "reinforcing layer 5" hereafter) is embedded in a conveyor belt 9 illustrated in FIG. 2. This reinforcing layer 5 functions as a core layer for bearing the tension that occurs when the conveyor belt 9 is stretched between pulleys.

This conveyor belt 9 is equipped with the reinforcing layer 5 as well as an upper cover rubber 6 and a lower cover rubber 7 disposed so as to sandwich the reinforcing layer 5 vertically, and these are formed integrally. The reinforcing layer 5 is composed of a plurality of steel cords 1. The plurality of steel cords 1 are arranged side by side in parallel in the belt width direction and are embedded in the rubber that forms the conveyor belt 9 so as to extend in the belt longitudinal direction.

Specifically, each steel cord 1 is covered by a cushion rubber 8, and the steel cords 1 and the cushion rubber 8 are joined by vulcanization bonding. The cushion rubber 8 is a rubber having excellent adhesiveness. The cushion rubber 8 is formed integrally with the upper cover rubber 6 and the lower cover rubber 7 by vulcanization bonding. Other constituents such as edge rubbers disposed at both ends in the belt width direction are also added as necessary to the conveyor belt 9.

The upper cover rubber 6 and the lower cover rubber 7 are made of a diene rubber containing at least a natural rubber, and a rubber composition having wear resistance enhanced by carbon black or the like is used. The thicknesses of the upper cover rubber 6 and the lower cover rubber 7 are determined appropriately in accordance with the performance required for the conveyor belt 9.

The steel cords 1 are formed by intertwining a plurality of steel wires. The steel cords 1 are substantially straight without any kinks. That is, the steel cords 1 are not crimped. The structure of the steel cords is described below. It is preferable to alternately arrange one S-twist steel cord 1 and one Z-twist steel cord 1 side by side in parallel.

The outer diameter D of the steel cords 1 is set to not less than 0.35 mm and not greater than 6.0 mm. The strength of the steel cords 1 is, for example, not less than 500 kN and not greater than 5000 kN.

The side-by-side pitch P of the steel cords 1 is set to greater than 0.35 mm and not greater than 7.0 mm. A cushion rubber 8 is interposed in the gaps between adjacent steel cords 1 arranged side by side in parallel so that the steel cords 1 do not touch one another. Therefore, the gaps between adjacent steel cords 1 arranged side by side in parallel are larger than 0 mm. The gaps are preferably not greater than the outer diameter D of the steel cords 1 and are, for example, not less than 0.22 mm and not greater than 1.5 mm.

Figure 3:
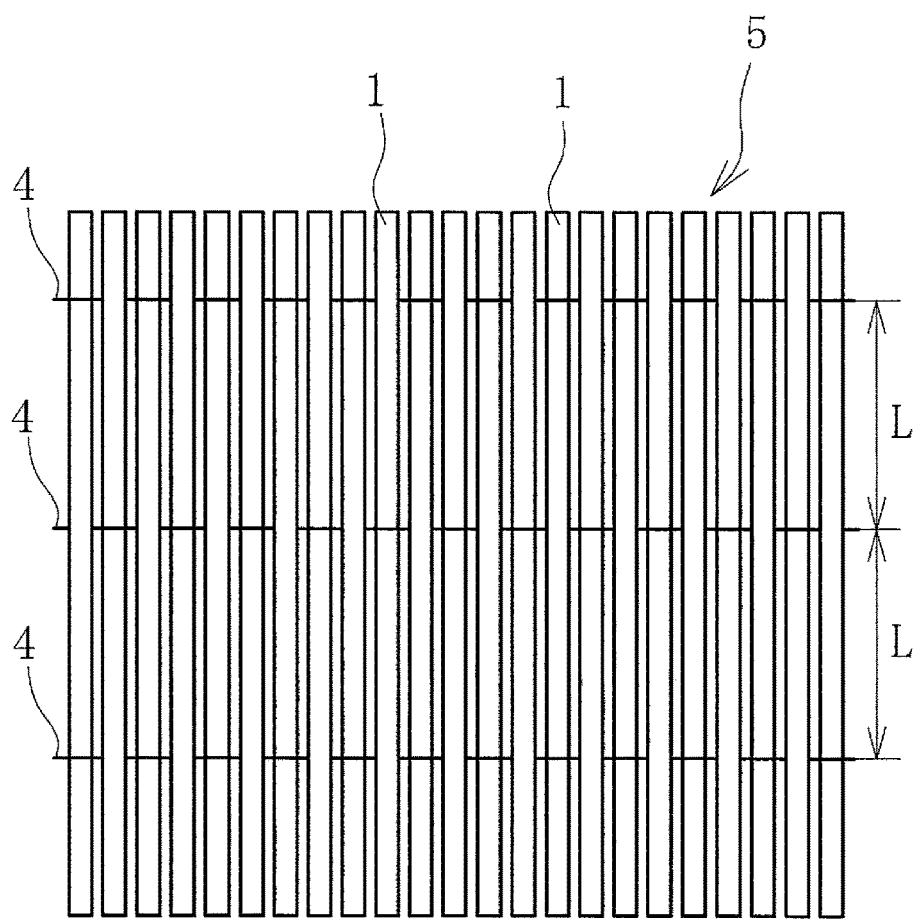
FIG. 3 is an explanatory diagram illustrating the reinforcing layer of FIG. 1 in a plan view.
Figure 4:
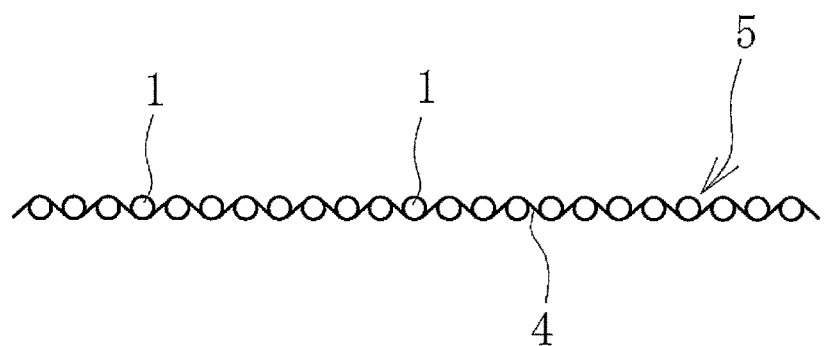
FIG. 4 is an explanatory diagram illustrating the reinforcing layer of FIG. 1 in a horizontal cross-sectional view.

As illustrated in FIGS. 3 and 4, in the reinforcing layer 5 of this embodiment, weft threads 4 pass vertically in a stitched manner between the steel cords 1 arranged side by side in parallel so as to traverse the steel cords 1. The weft threads 4 are disposed with a spacing L in the longitudinal direction of the steel cords 1.

The weft threads 4 are subjected to RFL (resorcinol formaldehyde latex) dip treatment in the manufacturing process. In RFL dip treatment, after the weft threads 4 are immersed in an RFL treatment liquid, the weft threads are dried so as to form an RFL treatment liquid coating on the surfaces of the weft threads 4. The weft threads 4 allow the steel cords 1 to be connected with one another.

The weft threads 4 can be provided optionally. Providing the weft threads 4 inhibits the disarrangement of the plurality of steel cords 1 arranged side by side in parallel in the manufacturing process. Thus, the handleability of the reinforcing layer 5 is markedly enhanced, which contributes to the improvement of the productivity of the conveyor belt 9.

The spacing L between the weft threads 4 is set, for example, to not less than 16 mm and not greater than 500 mm. When this spacing L is less than 16 mm, the number of man-hours required to manufacture the reinforcing layer 5 becomes excessively large. On the other hand, when the spacing L exceeds 500 mm, the effect of preventing the disarrangement of the steel cords 1 imparted by the weft threads 4 becomes too small.

In FIG. 3, the positions at which the adjacent weft threads 4 stitch the steel cords 1 together vertically are offset by the spacing L. That is, for a steel cord 1 having one adjacent weft thread 4 disposed on the upper side with the spacing L, the other adjacent weft thread 4 is disposed on the lower side of the steel cord 1.

Figure 5:
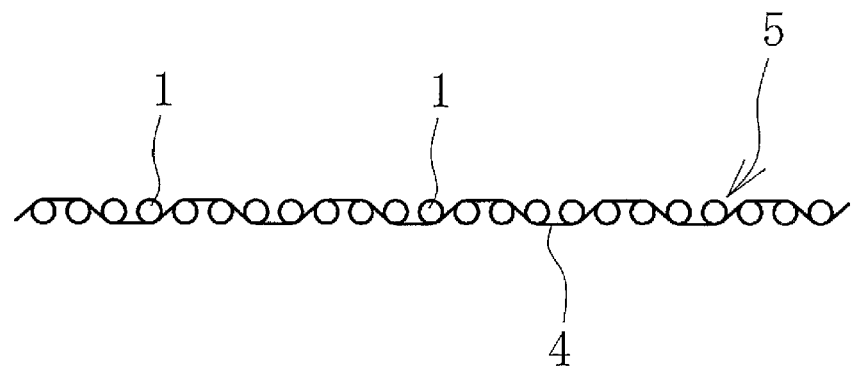
FIG. 5 is an explanatory diagram illustrating a modified example of the reinforcing layer in a horizontal cross-sectional view.

The weft threads 4 may not only traverse each steel cord 1 vertically in a stitching manner as illustrated in FIG. 4, but they may also traverse each set of two steel cords 1 vertically in a stitching manner as illustrated in FIG. 5. Alternatively, the weft threads 4 may also traverse each set of 3 or 4 steel cords 1 vertically in a stitching manner.

Resin fibers, for example, are used as the weft threads 4. Specifically, polyester fibers, nylon (nylon 6 or nylon 66) fibers, rayon fibers, aramid fibers, vinylon fibers, polyurethane fibers, or the like are used as the weft threads 4.

Taking into consideration flexibility or durability, the weft threads 4 are formed by weaving a plurality of long fibers, for example, and the fineness is set to not less than 300 dtex and not greater than 5000 dtex. The weft threads 4 have smaller diameters than that of the steel cords 1.

The steel cords 1 may employ various structures. One cord configuration from among a cord with a 1+6 configuration illustrated in FIG. 6, a cord with a 3+6 configuration illustrated in FIG. 7, a cord with a 1+19 configuration illustrated in FIG. 8, and a cord with a 1+Sew (19) configuration illustrated in FIG. 19 is used.

The twist multiple of the steel cords 1 is preferably set to not less than 9 and not greater than 14. The twist multiple is a value T/D indicating the ratio of the twisting pitch T of the steel cords 1 to the outer diameter D of the steel cords 1. When the twist multiple is less than 9, the strength of the steel cords 1 becomes insufficient, whereas when the twist multiple is greater than 14, it is not possible to ensure sufficient fatigue resistance.

Figure 6:
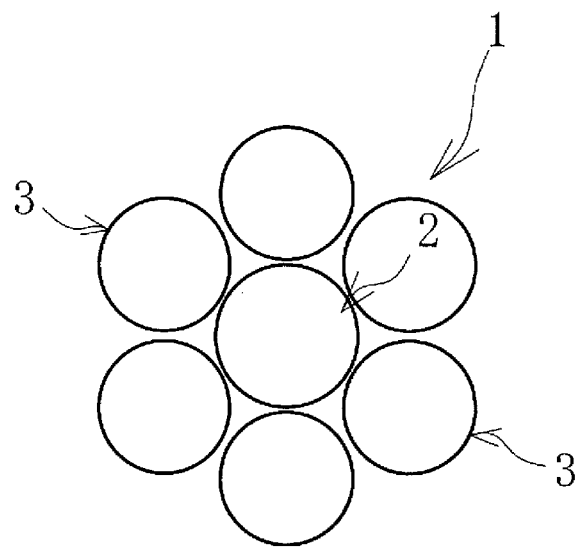
FIG. 6 is an explanatory diagram illustrating the steel cords of FIG. 1 in a horizontal cross-sectional view.

The steel cords 1 of the 1+6 configuration illustrated in FIG. 6 have an open structure in which six steel wires serving as side strands 3 are intertwined around the outer circumferential surface of one steel wire serving as a core strand 2.

Figure 7:
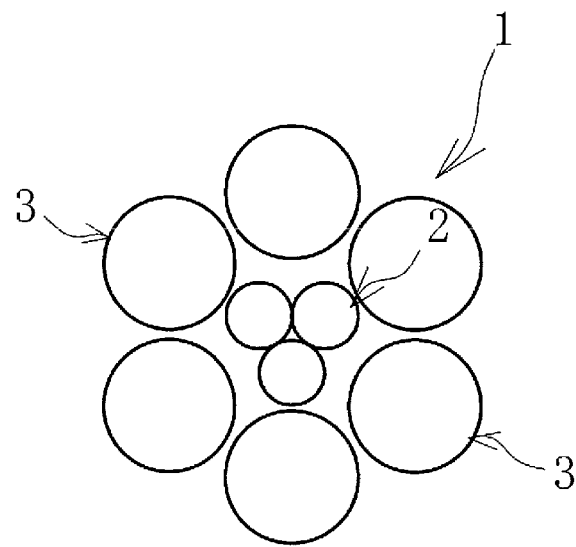
FIG. 7 is an explanatory diagram illustrating a modified example of steel cords in a horizontal cross-sectional view.

A steel cord 1 of the 3+6 configuration illustrated in FIG. 7 has an open structure in which six steel wires serving as side strands 3 are intertwined around the outer circumferential surface of three steel wires serving as core strands 2.

Figure 8:
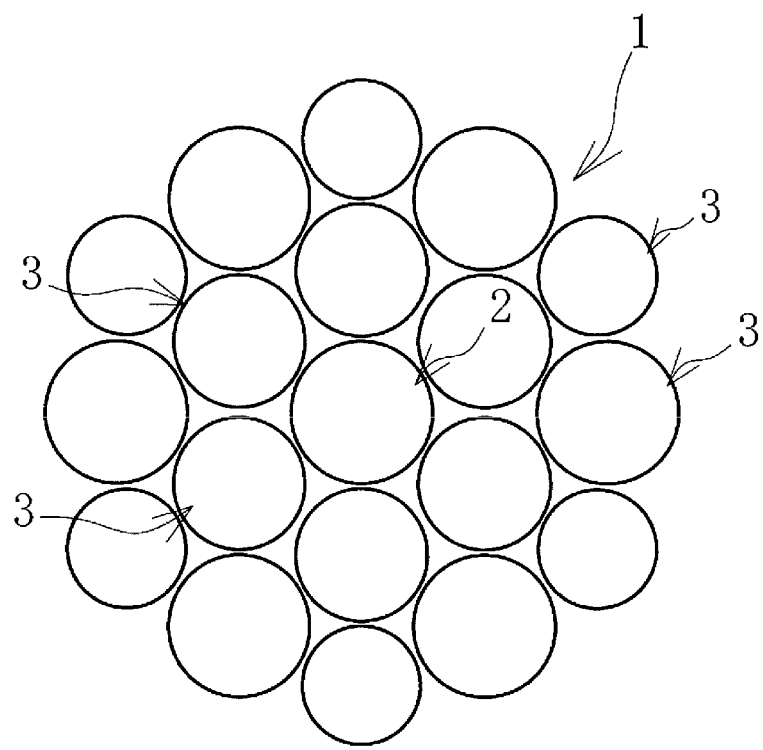
FIG. 8 is an explanatory diagram illustrating another modified example of steel cords in a horizontal cross-sectional view.

A steel cord 1 of the 1+19 configuration illustrated in FIG. 8 has an open structure in which six steel wires serving as side strands 3 are intertwined around the outer circumferential surface of one steel wire serving as a core strand 2, and 12 steel wires serving as side strands 3 are further intertwined around the outer circumferential surface thereof.

Figure 9:
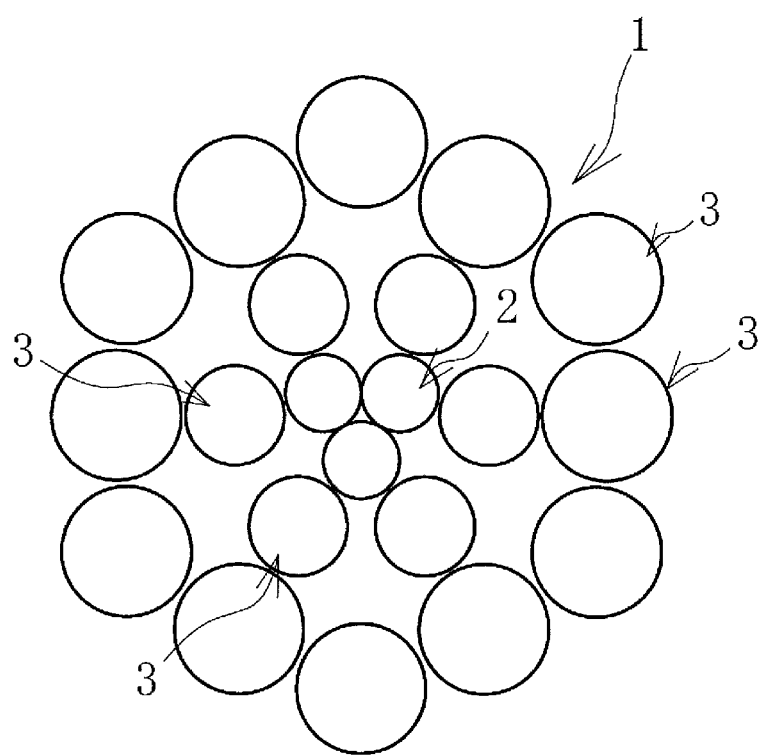
FIG. 9 is an explanatory diagram illustrating another modified example of steel cords in a horizontal cross-sectional view.

A steel cord 1 of the 1+Sew (19) configuration illustrated in FIG. 9 has an open structure in which six steel wires serving as side strands 3 are intertwined around the outer circumferential surface of three steel wires serving as core strands 2, and 12 steel wires serving as side strands 3 are further intertwined around the outer circumferential surface thereof.

When two types of steel wires with different outer diameters are used for the side strands 3 of the steel cord 1, the outer diameter of the steel wire with the relatively smaller diameter should be set to not less than 60% and not greater than 90% of the outer diameter of the steel wire with the relatively larger diameter. This enhances the permeability of the rubber.

In the case of the reinforcing layer 5 of the present technology, the diameter of the steel cord 1 is set to not less than 0.35 mm and not greater than 6.0 mm, which is a small diameter in comparison to conventional steel cords. As such, a rubber product (conveyor belt 9) in which the reinforcing layer 5 is embedded is also reduced in thickness and weight accordingly. This makes it possible to reduce the energy required to transport the conveyor belt 9 to the site of use or to operate the conveyor belt 9 at the site of use.

In the manufacturing process of this conveyor belt 9, the reduction in thickness of the conveyor belt 9 resulting from the reduction in thickness of the reinforcing layer 5 leads to a reduction in the vulcanization time of the conveyor belt 9. Therefore, it is also possible to reduce the energy required to manufacture the conveyor belt 9. Using the reinforcing layer 5 of the present technology thus makes it possible to effectively reduce the energy required to manufacture and use a rubber product in which the reinforcing layer 5 is embedded.

Making the diameter of the steel cords 1 small reduces the strength of each steel cord 1. However, the side-by-side pitch P of the steel cords 1 is set to greater than 0.35 mm and not greater than 7.0 mm, which is much shorter than that of conventional steel cords. Therefore, the steel cord 1 number density per unit belt width is enhanced. Accordingly, the number of steel cords 1 that can be embedded per unit belt width increases, which makes it possible to achieve sufficient total strength as a reinforcing layer 5 and to ensure that there is no loss in the reinforcing function thereof.

As a result of the reduction in thickness in the conveyor belt 9, the flexural rigidity of the conveyor belt 9 becomes small, and the energy loss occurring when traveling around the pulleys decreases. In addition, embedding a single reinforcing layer 5 formed from the steel cords 1 in a conveyor belt 9 is conventional common sense. The reason for this is that when a plurality of reinforcing layers 5 are embedded, a compressive force acts on the steel cords 1 constituting the reinforcing layer 5 embedded on the inner peripheral side when the conveyor belt 9 travels around the pulleys, which tends to lead to buckling. However, even if a plurality of these reinforcing layers 5 having a reduced thickness are embedded in the conveyor belt 9, the distance from the neutral plane of the steel cords 1 constituting the reinforcing layers 5 embedded on the inner peripheral side becomes small when the conveyor belt 9 travels around the pulleys. Therefore, the compression force acting on the steel cords 1 becomes very small, which makes it possible to embed a plurality of reinforcing layers 5 in the conveyor belt 9.

When the outer diameter D of the steel cords 1 is set to not less than 0.35 mm and not greater than 6.0 mm, it is possible to dramatically reduce the energy required to manufacture and use a rubber product in which the reinforcing layer 5 is embedded while ensuring the reinforcing function of the reinforcing layer 5.

The rubber product in which the reinforcing layer 5 of the present technology is embedded is not limited to the conveyor belt 9, and various rubber products in which steel cords 1 are embedded as a reinforcing member may be used, such as tires, rubber hoses, marine hoses, and fenders.

Here, the weight and vulcanization time of conveyor belts are estimated for cases where conveyor belts in which a single reinforcing layer is embedded are manufactured so as to have the same performance (the total strength of the reinforcing layer is substantially the same) and a thickness of 36.5 mm by varying only the outer diameters and number of the steel cords constituting the reinforcing layer 5. A specification in which the outer diameter D of the steel cords is set to 10.4 mm, the side-by-side pitch P is set to 16 mm, and the number of embedded cords is set to 59 is used as a conventional example. A specification in which the outer diameter D of the steel cords is set to 6.0 mm, the side-by-side pitch P is set to 7.0 mm, and the number of embedded cords is set to 13 is used as an example.

When the conventional example and the example are compared, the weight of the conveyor belt of the example can be reduced by approximately 18% in comparison to the conventional example, and the vulcanization time can be reduced by approximately 15%.

The invention claimed is:

1. A reinforcing layer for a rubber product comprising a plurality of steel cords extending side by side in parallel and embedded in a rubber used to form a rubber product, an outer diameter of the steel cords being not less than 0.55 mm and not greater than 6.0 mm, and a side-by-side pitch of the steel cords being greater than 0.35 mm and not greater than 7.0 mm, wherein weft threads are provided passing vertically in a stitched manner between the steel cords arranged side by side in parallel so as to traverse the steel cords, and the weft threads are disposed with a spacing in a longitudinal direction of the steel cords.

2. The reinforcing layer for a rubber product according to claim 1, wherein the weft threads are formed by weaving a plurality of long fibers, and a fineness is not less than 300 dtex and not greater than 5000 dtex.

* * * * *